Figure 3:
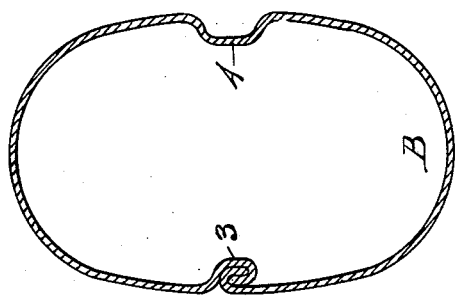

R. R. ELLIS.
TUBE CONSTRUCTION.
APPLICATION FILED NOV. 20, 1909.

988,083.

Patented Mar. 28, 1911.

Witnesses
O. B. Baenziger
C. C. Jennings

Inventor
Richard R. Ellis.
By Parker & Burton.
Attorneys

UNITED STATES PATENT OFFICE.

RICHARD R. ELLIS, OF DETROIT, MICHIGAN.

TUBE CONSTRUCTION.

988,083.  Specification of Letters Patent.  Patented Mar. 28, 1911.

Application filed November 20, 1909. Serial No. 529,036.

*To all whom it may concern:*

Be it known that I, RICHARD R. ELLIS, a citizen of the United States, residing at Detroit, county of Wayne, State of Michigan, have invented a certain new and useful Improvement in Tube Construction, and declare the following to be a full, clear, and exact description of the same, such as will enable others skilled in the art to which it pertains to make and use the same, reference being had to the accompanying drawings, which form a part of this specification.

This invention relates to tubular structures.

It has for its object an improved double walled tube, the separate members of which are made from sheet metal bent to tubular form with the meeting edges double seamed. That one of the tubes which is intended to be external is left as a double seamed tube, which for some structures may be a straight tube and for other structures a conical tube. That one of the members which is intended for the interior is grooved on the side opposite the double seam, on this tube, with a reentering groove that in the assembled structure engages along and partially around the double seam of the outer tube.

In the drawings this structure is shown and applied to what is known to the trade as a carriage bow socket, but the construction of the tube may be used for either straight or conical work as may be desired.

Figure 2:
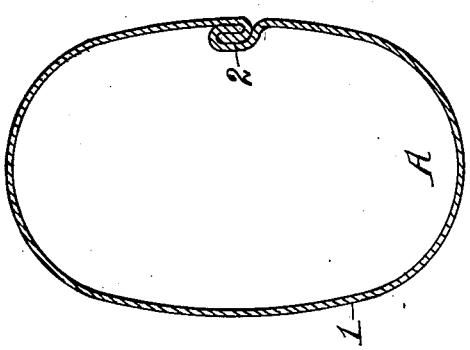
Figure 4:
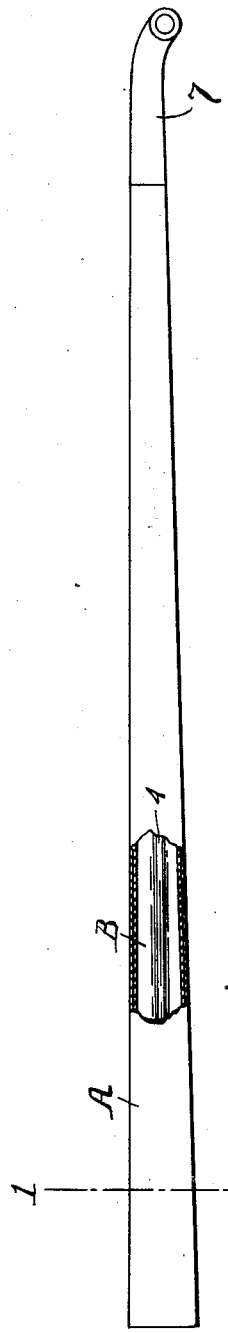
Figure 1:
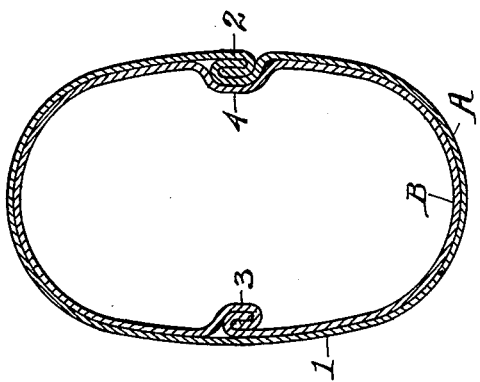

In the drawings: Figure 1, is a cross section of the tube. Fig. 2, is a cross section of the outer member in its folded form. Fig. 3, is a cross section of the inner or reinforcing member. Fig. 4, shows a complete bow socket.

The outer tube or member A is bent from sheet metal and the meeting edges are lapped and infolded to make what is known as a double seamed joint 2; the inner member B made of a size to fit accurately and tightly within the outer member, into which it can be forced, but into which it would not slide easily, is formed from sheet metal with edges meeting at double seamed joint 3. Opposite the double seamed joint 3 the walls of the tube are grooved with a reentering groove 4, proper in size to engage closely around the double seamed joint 2, and the member B is forced into the member A with the groove 4 engaging around the seam 2 and with the double seam 3 lying closely against the straight wall of the outer tube A.

When in this condition and arrangement the inner tube prevents the outer tube from yielding or spreading along the seam which is securely locked by the walls of the inner tube, and the outer tube also serves to lock the double seam of the inner tube, and thus, each serves to lock the seam of the other and the entire structure is extremely strong.

When used for a bow socket the structure is made with each part A and B conical in shape, and the inner tube or member is forced into the outer tube or member until the engagement is close and secure, and the coupling forging 7 is driven into the small end and secured thereto, generally and preferably by electric welding, but inasmuch as the special application to which the tube is applied does not form the main subject of this invention, this is shown as a merely useful purpose of the tubular structure, and is not intended to illustrate the sole use to which it can be put.

What I claim is:—

1. A tubular structure, having, in combination with an outer tube having the edges of the component sheet of metal united by a double seamed joint, an originally independent inner tube engaging closely within said outer tube, said inner tube also having its meeting edges united by a double seamed joint, and being provided with a lengthwise extending groove opposite said joint, said groove being adapted to register with the jointed portion of the outer tube, and the jointed portion of the inner tube lying against the plain inner face of the outer tube opposite its jointed portion, substantially as described.

2. A tubular structure, having, in combination with an outer tube having the meeting edges of its component metal walls united by a double seamed joint, a closely fitting inner tube having its meeting edges similarly united, but adapted to be located on the opposite side of the assembled tube from that whereon the meeting edges of the outer tube are located, said inner tube being provided with a longitudinal groove wherein the double seamed joint in the outer tube engages the mass of the joined edges of the outer tube being so accommodated within said groove as to leave the curvature of the outer periphery of the tube practically unbroken, substantially as described.

3. A tubular structure, comprising a pair of originally independent telescoping tubes, each having a longitudinally extending double seamed joint, and the inner one of said tubes having oppositely located to said joint a longitudinally extending groove wherein said jointed portion of the outer tube engages when the two tubes are in assembled relation, said double seamed joint in the inner tube engaging against the adjacent plane inner face of the outer tube with its parts pressed closely against one another thereby, substantially as described.

In testimony whereof, I sign this specification in the presence of two witnesses.

RICHARD R. ELLIS.

Witnesses:
C. F. BURTON,
WILLIAM M. SWAN.